United States Patent [19]

Anderson

[11] Patent Number: 4,840,269
[45] Date of Patent: Jun. 20, 1989

[54] APRON TYPE CONVEYOR

[75] Inventor: William B. Anderson, Oconomowoc, Wis.

[73] Assignee: Rexnord Inc., Brookfield, Wis.

[21] Appl. No.: 174,009

[22] Filed: Mar. 28, 1988

[51] Int. Cl.⁴ ............................................. B65G 17/10
[52] U.S. Cl. ..................................... 198/822; 198/851
[58] Field of Search ................ 198/822, 850, 851, 853

[56] References Cited

U.S. PATENT DOCUMENTS

| 1,804,423 | 5/1931 | Krenzke | 198/822 X |
| 2,936,063 | 5/1960 | Hemsley | 198/822 X |
| 3,162,295 | 12/1964 | Adamson | 198/822 |
| 3,243,035 | 3/1966 | Ratkowski | 198/822 |
| 3,249,208 | 5/1966 | Carradus | 198/822 |
| 4,697,696 | 10/1987 | Howe et al. | 198/822 |

FOREIGN PATENT DOCUMENTS

| 561616 | 9/1932 | Fed. Rep. of Germany | 198/822 |
| 943097 | 4/1956 | Fed. Rep. of Germany | 198/822 |
| 1023400 | 1/1958 | Fed. Rep. of Germany | 198/822 |
| 1065775 | 9/1959 | Fed. Rep. of Germany | 198/822 |
| 1204676 | 1/1960 | France | 198/822 |
| 789665 | 1/1958 | United Kingdom | 198/822 |

Primary Examiner—Robert J. Spar
Assistant Examiner—D. Glenn Dayoan
Attorney, Agent, or Firm—Michael, Best & Friedrich

[57] ABSTRACT

A conveyor having a series of pans mounted on chain links with the leading and trailing edges of the pans overlapping. The trailing edge of each pan has a stiffened transverse arcuate based contacted by the front corner of a transverse arcuate front bead on the rearwardly adjacent pan under all operating conditions. The shape of the beads causes the front bead to deflect and self bias into contact. End plates are welded to the pan except at the front bead from the leading corner to the peak of the arc of the bead. This leaves the front portion free to flex to develop the bias. The end plates are also shaped to develop bias to maintain line contact of the front edge of the end plate on the rear portion of the end plate next ahead. The plates overlap in all operating conditions.

8 Claims, 3 Drawing Sheets

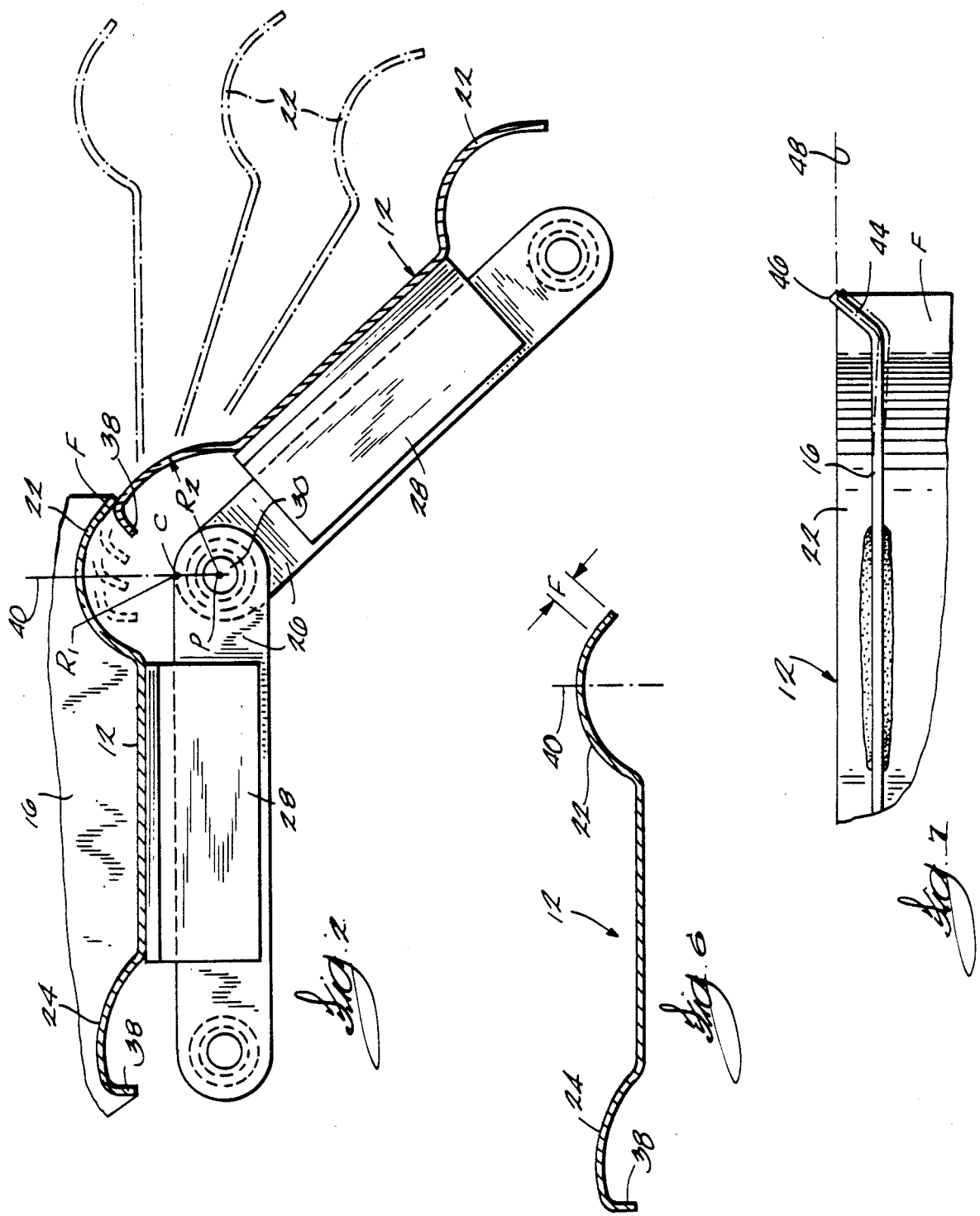

APRON TYPE CONVEYOR

BACKGROUND OF THE INVENTION

This invention relates to apron type conveyors having a multiplicity of pans provided with end plates. The pans and end plates overlap the pans and plates of adjacent conveyor sections so as to minimize the passage or loss of material through the joints as the pans articulate with respect to one another in turning around sprockets and the like. The art has heretofore undertaken to provide mating surfaces of adjacent pans with small clearance therebetween. The small clearance, however, permits fine materials and small chunks and clinkers to get into the clearance space between the pans. Inevitably some of that material becomes jammed therein and causes distortion and wear of the sliding parts of adjacent conveyor sections. As time goes on, larger chunks can get caught and cause more wear and bending of the parts until they have to be replaced. Some of the prior art has undertaken to allow passage of a certain amount of material into troughs or pockets, but trouble is experienced with chunks getting between the parts as they tend to close up, thus causing extreme wear or beinding of the parts.

Attention is further directed to the U.S. Howe et al. U.S. Pat. No. 4,697,696, issued Oct. 6, 1987.

SUMMARY OF THE INVENTION

This invention provides mutually overlapping pans mounted on chain links. The forward portion of each pan is formed to provide a large transverse arcuate bead and the trailing portion of each pan is formed to provide a small transverse arcuate bead. The forward edge of each large bead overlaps and is biased into contact with the small bead under all operating conditions to thereby eliminate passage of materials therebetween as the links pivot relative to each other. An end plate is provided on each side (or end) of each pan. The plates overlap and are biased into contact with the end plates of adjacent conveyor units.

A further feature of this invention resides in curving the small bead at the trailing edge of each pan about a center which is substantially coincident with the pivot point of the associated conveyor links. The large bead is also arcuate in cross section but is formed on a different center so that the front edge of the large bead has an interference engagement with the small bead of the next forward pan throughout all normal operating angular relationships of the pans with respect to each other. The front corner of the large bead is biased into contact with the small bead and the resulting sliding/scraping movement prevents passage of material and fines between the pans.

Still another feature of this invention is shaping the end plates so as to bias one plate against the other to maintain line contact between end plates of adjacent units to minimize passage of material between the adjacent end plates.

BRIEF DESCRIPTION OF THE DRAWINGS

FIG. 2 is an enlarged detail showing multiple positions as the conveyor pans articulate in passing around a sprocket.

FIG. 6 is an enlarged side view of the pan showing details of the construction.

FIG. 7 is an enlarged detail view indicating the interference fit between the end plates.

DETAILED DESCRIPTION OF THE DRAWINGS

Figure 1:
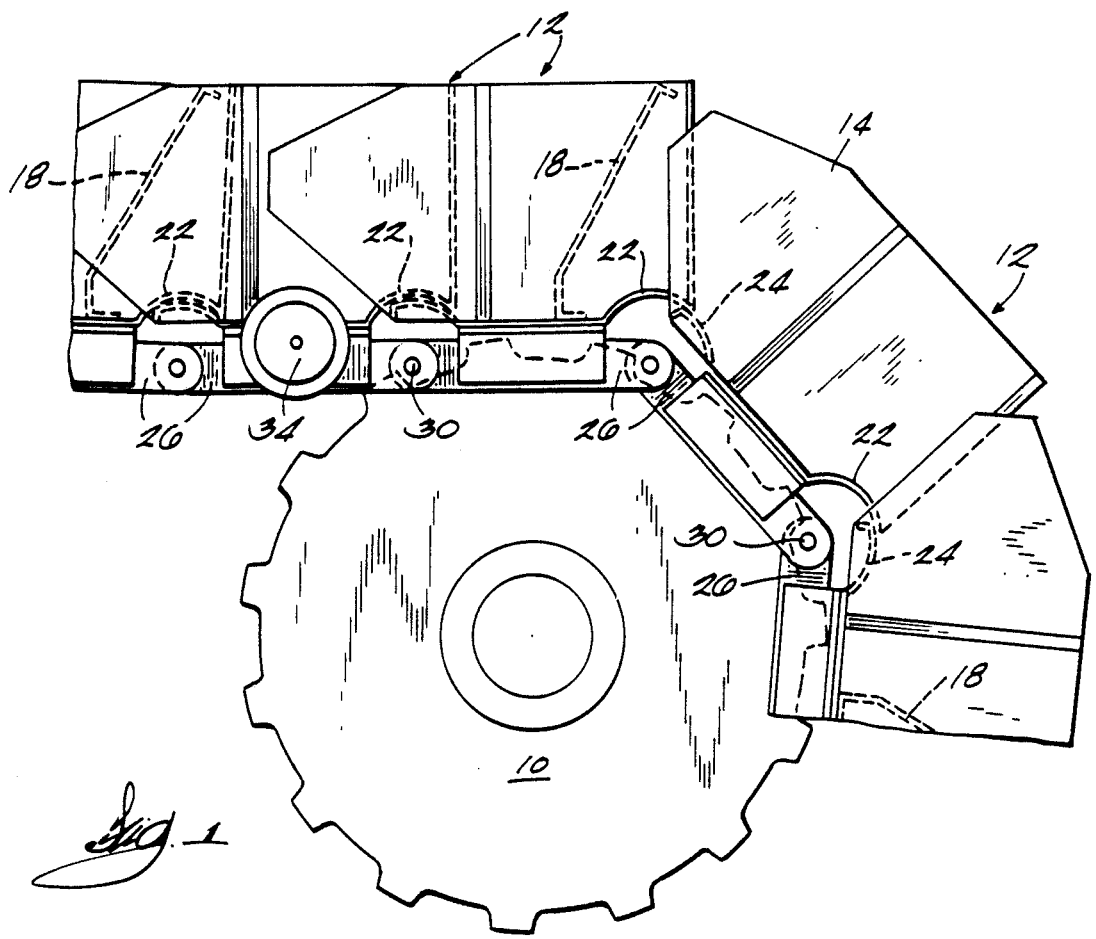
FIG. 1 is a side elevation of the conveyor passing over a sprocket.
Figure 3:
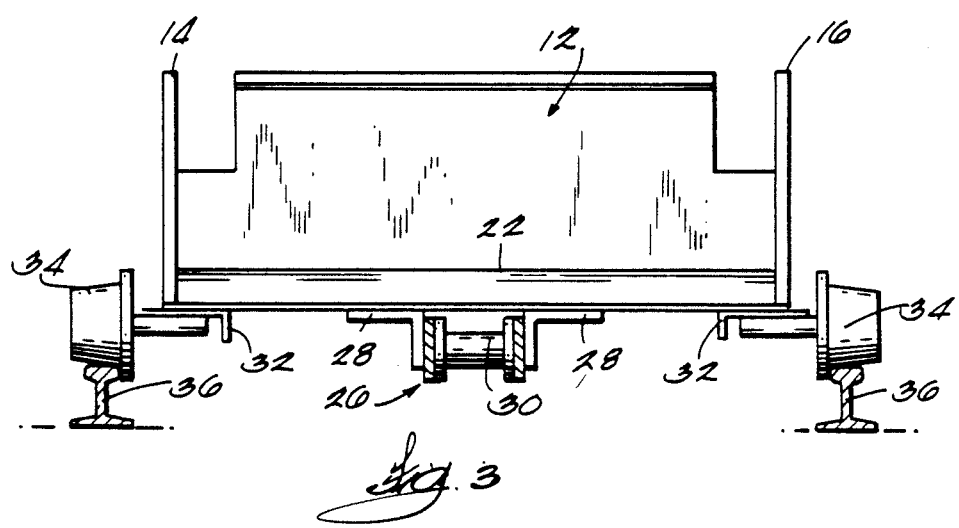
FIG. 3 is a detailed view transverse to the line of travel.
Figure 4:
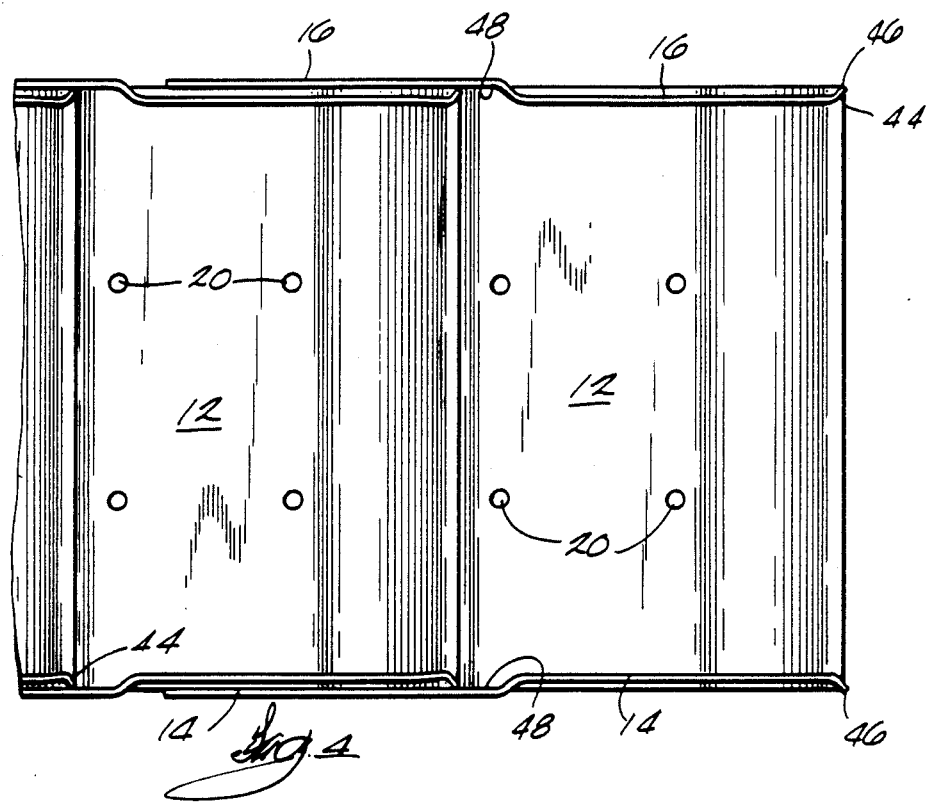
FIG. 4 is a plan view of the conveyor omitting the optional pushers.
Figure 5:
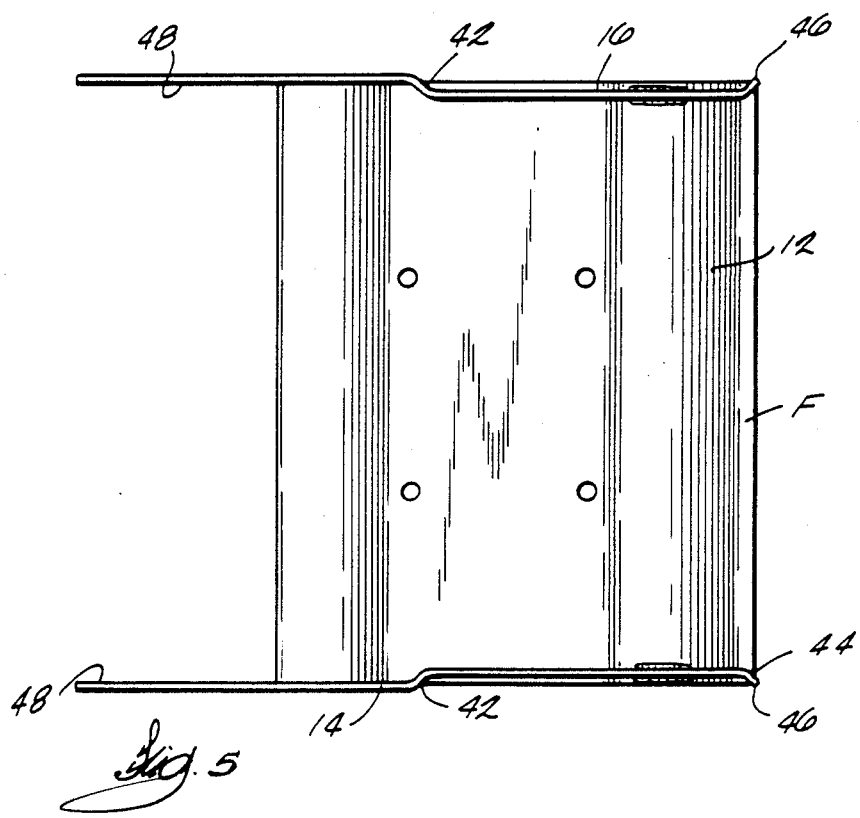
FIG. 5 is a more detailed view from above showing the end plate construction.

For illustrative purposes, a portion of the present apron conveyor is shown with the pans horizontally disposed as they approach the sprocket 10. In practice, the illustrated design can be utilized at rather steep angles, say 40° or 45°, and in that case the sprocket would be the upper sprocket where the contents of the conveyor are discharged. Each cell or unit of the conveyor has a pan 12 with end plates 14, 16 welded thereto. These end plates can be of various heights and those illustrated in FIG. 1 are about 12 inches high and can be utilized in conjunction with the optional pushers 18 when conveying at a steep angle. When used, a pusher 18 is bolted to each pan through the bolt holes 20, 20 just behind the large bead 22 transverse to the pan adjacent the forward or leading edge of the pan. A small bead 24 transverse to the pan is provided at the rear or trailing edge of the pan 12. These beads will be discussed in considerable detail hereafter.

The conveyor is provided with a chain assembly, generally denoted 26, bolted between the two angle irons 28 bolted on the underside of the pan. While in the illustrated arrangement a single strand chain is shown, in other constructions multiple chains could be used. Additionally, in other constructions the angle irons 28 could be integral portions of the chain sidebars. The chain links 26 are interconnected for articulation by pivot pins 30. A small bracket 32 is welded to the underside of the pan 12, and the outboard style roller 34 is bolted thereto and rolls on the rail 36. Rollers 34 are mounted on each side of the conveyor. Not every pan is provided with a roller and, depending upon the load conditions, the rollers can be on every other pan or can be spaced even more.

As may be seen in FIG. 1, the chain links engage the sprocket 10. As the cahin runs around the sprocket the pans are articulated with respect to one another. Both on the straight run and at the turn, it is desirable to minimize leakage of fines from the conveyor and also to minimize entrapment of fines and clinkers at locations where it would contribute to rapid wear or bending of the steel plates of the pan. The prior art has undertaken to provide complementary parts with small clearance therebetween. Such small clearance, however, allows passage of fines. Some of the prior art provides pockets to receive the fines which work through the theoretical seal. These pockets prove to be notable traps for clinkers which can bend the plates as the parts came back to their normal running position.

Pan 12 has a large bead 22 parallel to its leading edge and a small bead 24 at the trailing edge. As shown in FIG. 2, the large bead 22 is formed on an inside radius R1 about center C. The front edge of the large bead 22 is, in fact, flat for a distance F back from the edge. The purpose of this flat is to make the edge somewhat more flexible than it would be with a curvature. This resiliency is utilized in this design, as will appear.

The trailing edge of the pan 12 has a small bead 24 having an outside radius R2 about a pivot point P which, when the unit is assembled to the chain link, coincides with the pivot axis of the pins 30 interconnecting the chain links 26. The rear edge of the small bead 24 is turned downwardly as indicated at 38 to make the small bead quite stiff and resistant to flexure.

When the pan is assembled on the chain links, the small bead 24 lies closer to the pivot 30 than does the large bead 22. The large bead 22 overlies the small bead 24 or is uppermost. As can be seen in the drawings, the outside radius of the small bead is centered on the pivot point 30, whereas the large bead center C is offset in such a manner that only the corner of the flat F engages the small bead. In fact, there is a small amount of built-in interference, that is, were it not for the presence of the small bead, the front corner of the large bead would lie closer to the pivot. This build in the interference and therefore self-biases the large bead into firm engagement with the small bead which is stiffened by the in-turned end 38 to resist flexure. Therefore, metal-to-metal wiping contact is maintained throughout the articulation of the links relative to one another as illustrated in the drawings. This precludes passage of fines at this point. Therefore, there is no need to provide for entrapment of the fines that get past the point.

As indicated above, the end plates are welded to the pan, but if the end plates were welded to the full length of the side of the pan, the front edge of the pan could not flex. Therefore, there is no weld between the end plate and the pan forward of the line 40 (denoting the maximum height of the curved bead). This lets the leading edge of the pan flex and also lets the leading edge of the end plate flex.

It will be noted that in the forward portion of the end plate 14, the plate is formed inwardly at 42 and then the front edge 44 of the end plate is turned out at about a 45° angle, thus forming a sharp corner 46 at the inside of the trailing portion 48 of the side plate on the next forward conveyor unit. As may be seen in detail in FIG. 7, this forward edge 44 is turned to extend slightly past the plane of the trailing portion 48 of the plate on the next ahead unit. This then means there is a built-in interference between the two plates. The resilience of the forward edge 44, by reason of there being no weld of the forward portion of the side plate to the pan, will let that portion of the plate defect slightly, as will the trailing portion of the end plate. This biases the plates together to provide a firm wiping contact which prevents passage of fines between the plates both during the run and during the discharge. As the plates come back into normal run position, this firm wiping contact will clean off the surfaces. The end plates overlap in all operating conditions.

The provision of the overlapping arcuate beads on the pans formed so that the front corner of the upper or outer bead is resiliently biased into engagement with the lower bead has proven to be a very effective seal against passage of fines. This also prevents entry of fines between the beads, thus minimizing wear. Finally, the line contact prevents entrapment of clinkers of any size at that point, and this virtually eliminates bending of the pans in response to trapped clinkers. The formation of the end plates so as to bias the plates into engagement, again on a line contact, also operates to prevent loss of fines through that joint and prevents entrapment of clinkers which lead to severe wear or bending of the end plates.

I claim:

1. An apron type belt conveyor comprising,
    a plurality of pivotally interconnected chain links mounted for forward movement generally parallel to the length of the links,
    sprockets engaging said links for driving said conveyor,
    mutually overlapping pans each mounted on a chain link and having a pitch which equals the spacing between successive chain links,
    said pans being movable in a forward direction with said conveyor,
    the forward portion of each pan being elastic and formed to provide a large transverse arcuate bead and the trailing portion of each pan being elastic and formed to provide a small transverse arcuate bead,
    said large and small beads having different centers and the forward edge of each large bead overlapping and being biased into contact with the small bead on the pan next ahead to flex the beads within their elastic limits at all times during operation and as the conveyor passes over said sprockets,
    an end plate on each end of each said pan,
    the front of each end plate and the rear of the next forward end plate being shaped to overlap and engage each other at all times during operation.

2. An apron type belt conveyor according to claim 1 in which said links are pivotally interconnected for pivotal movement about a center,
    said small bead being curved on a radius generally concentric with said center,
    said large bead being curved about another center and shaped so each said forward edge has an interference fit with the small bead of the next forward pan under all operating relationships of said pans.

3. An apron type belt conveyor according to claim 2 in which said end plates are shaped so as to maintain contact with the adjacent end plates substantially on a line to minimize passage of material therebetween.

4. An apron type conveyor comprising,
    a plurality of pivotally interconnected chain links mounted for forward movement generally parallel to the length of the links,
    sprockets engaging said links for driving said conveyor,
    a pan mounted on each chain link and overlapping the next forward and next rearward pan at all times during operation,
    said pans being movable in a forward direction with said conveyor,
    the forward portion of each pan being elastic and formed to provide a large transverse arcuate bead and the trailing portion of each pan being elastic and formed to provide a small transverse arcuate bead;
    said large and small beads having different centers and the forward edge of each large bead overlapping and being biased into contact with the small bead on the pan next ahead to flex the beads within their elastic limits at all times during operation and as the conveyor passes over said sprockets.

5. An apron type conveyor according to claim 4 including an end plate on each end of each pan,
    each said end plate having contact with the next adjacent forward and rearward end plates to obtain a wiping action between the contacting plates as they move relative to each other.

6. An apron type conveyor according to claim 5 in which the bead on the leading edge in the direction of travel of each pan is the upper bead and overlies the bead on the trailing edge in the direction of travel of the next foreward pan.

7. An apron type conveyor comprising,
a plurality of pivotally interconnected chain links mounted for forward movement generally parallel to the length of the links,
sprockets engaging said links for driving said conveyor,
a pan mounted on each chain link and overlapping the next forward and next rearward pan at all times during operation
said pans being movable in a forward direction with said conveyor,
a transverse arcuate bead on the leading and trailing edges of each said pan,
the corner of the edge of the upper bead of each overlapping pair of beads being biased into contact with the lower bead at all times during operation
an end plate on each end of each pan,
each said end plate having contact with the next adjacent forward and rearward end plates to obtain a wiping action between the contacting plates as they move relative to each other,
the bead on the leading edge of each pan being the upper bead and overlying the bead on the trailing edge of the next forward pan, said end plates being welded to each said pan and the forward edge of each end plate is substantially co-terminal with the corner of said leading edge,
said bead on said leading edge being arcuate about a center and the portion of said pan extending from about the high point of said arcuate bed to the forward edge of such bead being not welded to said end plates so said portion of said pan may flex.

8. An apron type belt conveyor according to claim 7 in which the bead on the trailing edge of said pan is curved about a point substantially coincident with the pivot connection between links,
said center being displaced from said point to ensure contact of only said corner of said leading edge with said bead on the trailing edge.

* * * * *